US006034617A

United States Patent [19]

Luebke et al.

[11] Patent Number: 6,034,617

[45] Date of Patent: Mar. 7, 2000

[54] OPERATOR INTENT BASED PASSIVE KEYLESS VEHICLE CONTROL SYSTEM

[75] Inventors: Charles J. Luebke, Sussex, Wis.; Thomas J. Waraksa, Clarkston; John D. Prainito, Rochester Hills, both of Mich.; Richard C. Barthel, Libertyville, Ill.; David R. Kahl, Waterford; James A. Poirier, Sterling Heights, both of Mich.

[73] Assignee: Eaton Corporation, Cleveland, Ohio

[21] Appl. No.: 09/205,914

[22] Filed: Dec. 4, 1998

[51] Int. Cl.[7] ..... G06F 7/04

[52] U.S. Cl. ..... 340/825.31; 307/10.2; 340/522

[58] Field of Search ..... 340/825.31, 825.34, 340/825.69, 522, 539, 573.1, 426; 307/10.2; 180/287; 341/176

[56] References Cited

U.S. PATENT DOCUMENTS

| | | | |
|---|---|---|---|
| Re. 30,686 | 7/1981 | Bucher | 290/38 R |
| 2,679,601 | 5/1954 | Hart | 307/10.6 |
| 4,674,454 | 6/1987 | Phairr | 123/179.2 |
| 4,688,036 | 8/1987 | Hirano et al. | 340/825.07 |
| 4,928,778 | 5/1990 | Tin | 180/167 |
| 5,000,139 | 3/1991 | Wong | 123/179.2 |
| 5,042,439 | 8/1991 | Tholl et al. | 123/179.2 |
| 5,054,569 | 10/1991 | Scott et al. | 180/167 |
| 5,459,489 | 10/1995 | Redford | 345/179 |
| 5,583,486 | 12/1996 | Kersten | 307/10.2 X |
| 5,602,535 | 2/1997 | Boyles et al. | 340/825.31 |
| 5,612,578 | 3/1997 | Drew | 307/10.5 |
| 5,723,911 | 3/1998 | Glehr | 307/10.2 |
| 5,790,015 | 8/1998 | Iitsuka | 340/426 |
| 5,790,043 | 8/1998 | Hettich et al. | 340/825.31 |
| 5,959,545 | 9/1999 | Lhamon | 340/825.44 |

OTHER PUBLICATIONS

Mehrdad Foroozesh, "Protecting Your Data With Cryptography," UNIX Review, Nov. 1996, v14, n12, p. 55(6).

*Primary Examiner*—Thomas Mullen
*Attorney, Agent, or Firm*—Quarles & Brady LLP

[57] ABSTRACT

A passive remote operating system is disclosed which may be employed to gain entry to a vehicle. A remote control, carried by a driver, periodically transmits a command signal whenever the remote control is moving. As the driver approaches the vehicle, the remote control comes within the reception range of a control circuit in the vehicle, which then receives the command signal. Receipt of the command signal activates the control circuit to begin sensing for an action by the driver, such as operation of a door handle, which indicates an intention to enter the vehicle. Upon sensing that action within a given period after receipt of the command signal, the doors of the vehicle are unlocked.

20 Claims, 3 Drawing Sheets

OPERATOR INTENT BASED PASSIVE KEYLESS VEHICLE CONTROL SYSTEM

BACKGROUND OF THE INVENTION

The present invention relates to keyless systems for gaining entry into motor vehicles, and more particularly to passive remote keyless vehicle entry systems, which do not require activation by a user.

Automobiles traditionally have used mechanical keys and locks to protect against unauthorized access to the vehicle. However, mechanical locks are vulnerable to a criminal forcibly removing the lock cylinder, thereby being able to release the door catch without a key. Other vulnerability arises from the ability to duplicate easily most mechaincal keys.

With the increased use of electronic systems in vehicles came the ability to provide more sophisticated access control. Remote keyless entry (RKE) systems commonly take the form of a fob which is attached to the driver's key ring. The fob houses a radio transmitter which sends a digital code via a radio frequency (RF) signal to the vehicle when the driver presses a switch on the fob. The digital code prevents spurious radio signals from activating the door lock, as well as making it difficult for unauthorized persons to gain access to the motor vehicle. The RF signal also encodes whether the user wishes the doors to be locked or unlocked, the trunk to be unlatched or another function to be performed, as determined by which switch on the fob is pressed by the user. Encryption algorithms often are employed to make it extremely difficult for a thief to eavesdrop on the fob transmissions and learn the security codes.

A receiver mounted in the motor vehicle detects the transmission from the fob and decodes the RF signal to determine whether it is valid for that vehicle and which one of the various functions is to be performed. The receiver then activates the appropriate components to perform that function.

Conventional keyless entry systems require that the user activate the fob by pressing a switch in order to send a signal to the vehicle. If the user's arms are carrying packages or a child, it may not be convenient to activate the small fob located in a pocket or purse. Thus it is desirable to provide a passive keyless entry system that does not require fob activation by the user.

It is not uncommon for a family to have two or more vehicles each with a separate fob for remote access. This requires a person to either select the correct fob for the vehicle that is desired to be driven or to carry a fob for each vehicle. Thus it is advantageous to permit a single fob to access multiple vehicles. However, it is undesirable to have a single transmission from this fob unlock several vehicles when the user only wants access to one.

SUMMARY OF THE INVENTION

A general object of the present invention is to provide a passive remote keyless vehicle entry system which does not require manual activation by the user.

Another object is to provide an unlocking sequence that protects vehicles from being unlocked inadvertently.

These and other objectives are satisfied by a keyless motor vehicle control system having a remote control adapted to be carried by a driver. The remote control occasionally transmits a command signal. In the preferred embodiment, the remote control senses when it is moving and while moving periodically transmits the command signal.

A receiver in the vehicle receives the command signal from the remote control, and in response produces a receiver signal. A sensor also is located on the vehicle to detect an action by the driver which indicates an intention to operate the device. That action may involve touching a part of the vehicle such as a door handle or lock cylinder, or the driver simply being within a given distance from the vehicle. A sensor signal is produced to indicate the occurrence of that action by the driver.

A controller in the motor vehicle is connected to the sensor, the receiver and a device to be operated, such as the door locks. An activation signal is sent to the device when the controller receives the receiver signal and the sensor signal. Preferably, the activation signal is produced only when the sensor signal is received within a predefined period of time after receipt of the receiver signal.

DETAILED DESCRIPTION OF THE INVENTION

Figure 1:
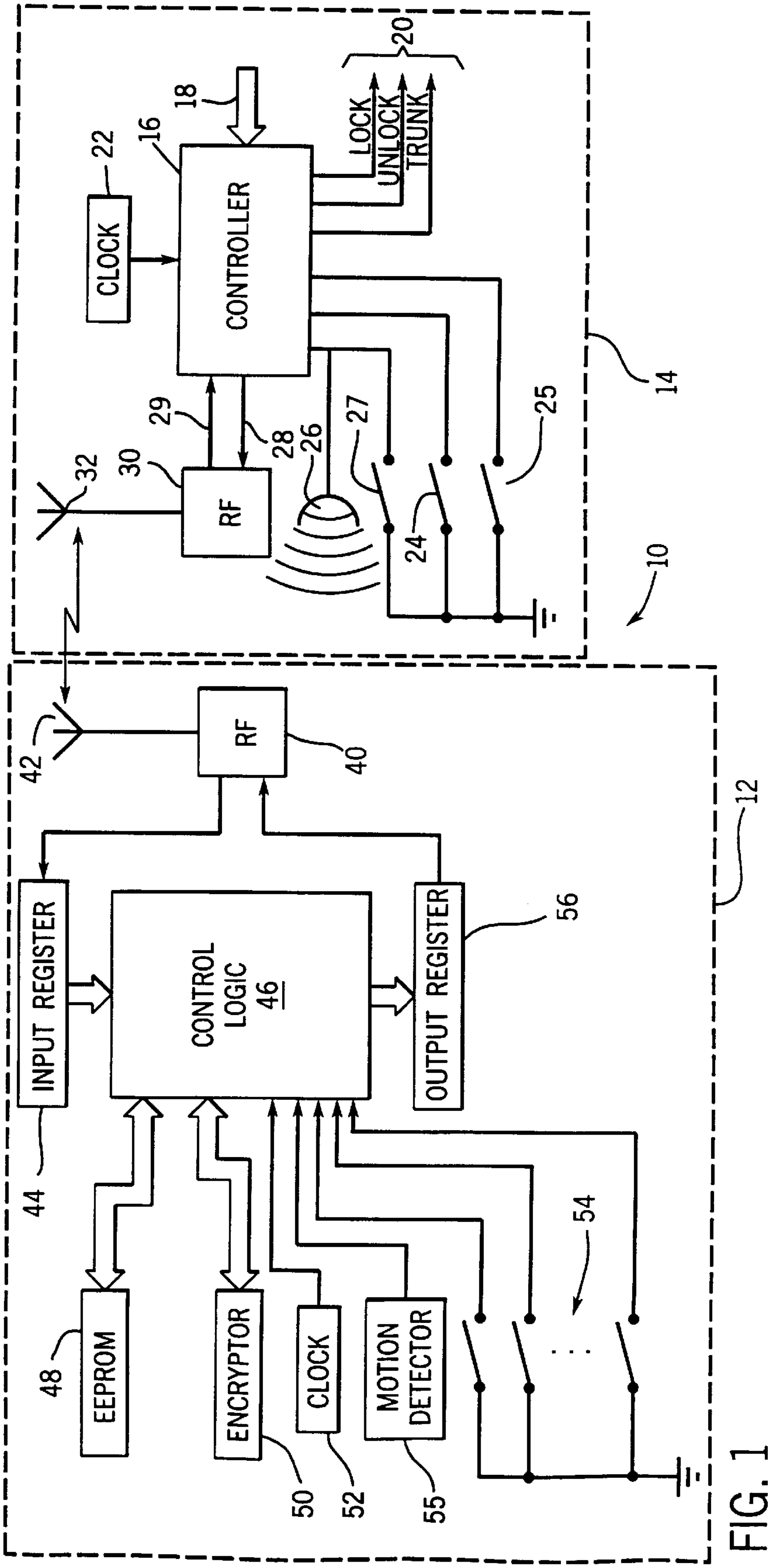
FIG. 1 is a block schematic diagram of a remote keyless entry (RKE) system for a motor vehicle.

With initial reference to FIG. 1, a keyless motor vehicle control system 10 comprises a portable remote control 12 carried by a driver and a control circuit 14 located in the motor vehicle. The control circuit 14 includes a controller 16 such as a microcomputer with an internal memory in which a control program and operating data are stored. A conventional clock circuit 22 supplies timing pulses to the controller 16. A plurality of manual input switches 24 and 25 enable a service technician to place the controller 16 into different operating modes, such as a programming mode in which access codes are stored in the controller's memory.

The control circuit 14 also incorporates a mechanism which detects the proximity of a person to the motor vehicle. This mechanism may constitute a conventional proximity detector 26, such as one that transmits ultrasound, microwaves or infrared light and senses when that radiation is reflected back by an object in close proximity to the vehicle. Alternatively, the proximity sensor can be replaced by a switch 27 that closes when someone touches or operates a door handle of the vehicle. Such a switch may be a capacitive sensor at the door handle.

The control circuit 14 operates several functions, such as locking and unlocking the doors and unlatching the trunk lid. For that functionality, the controller 16 is interfaced to the corresponding actuating devices on the motor vehicle. In some motor vehicles, the various functions are controlled by an another computer to which the controller 16 sends operating commands via a communication bus 18. In other installations, the controller 16 has individual output lines 20 connected directly to the control devices for the respective functions to be operated. Specifically, separate wires may be coupled to actuators which lock and unlock the doors and unlatch the trunk lid.

A serial output line 28 and a serial input line 29 of the controller 16 are connected to a first radio frequency transceiver 30. The first transceiver 30 modulates a standard radio frequency carrier with the serial data received on line 28 and transmits that modulated radio frequency signal via an antenna 32. The first transceiver 30 also demodulates other radio frequency signals received by the antenna 32 to recover serial digital data which then is sent via line 29 to the controller 16.

The first transceiver 30 is designed to communicate with a second radio frequency transceiver 40 within the remote control 12, which may have the form of a key ring fob. The second transceiver 40 has a receiver section coupled to an antenna 42. The receiver section demodulates a received radio frequency signal to recover digital data that modulates that signal and the recovered data is sent in a serial format to an input register 44. The input register 44 converts the serial data stream from the second transceiver 40 into a parallel format which is read by a control logic 46. The control logic 46 may be either a hardwired device for sequentially performing the remote control operations, or a programmable device which executes a software program to perform those operations. Control logic of this general type is similar to that used in previous types of RKE transponders and their conventional technology can be utilized to implement the functions of the present control logic 46.

The control logic 46 of the remote control 12 is connected to an electrically erasable programmable read only memory (EEPROM) 48 which stores codes to be transmitted to the motor vehicle control circuit 14 when the remote control is activated. A clock circuit 52 provides timing signals for the remote control 12. A plurality of user operable switches 54 are connected to different input lines of the control logic 46 allowing the driver to select the specific functions to be performed on the motor vehicle. For example, a pair of switches can be provided for locking and unlocking the passenger doors, while another switch is for unlatching the trunk lid. In addition a motion detector 55, for example a ball in a cage type, provides an input signal to the control logic 46 whenever the remote control 12 is being moved, such as when the driver carrying the remote control is walking.

The remote control 12 also includes an encryptor 50 connected to the control logic 46 to encrypt a remote control security number for transmission to the control circuit 14. The encryptor 50 utilizes a secret-key cryptography algorithm to encrypt data being transmitted. For example, the algorithm specifies a sequence of logical operations which are performed on a known seed number and a challenge number received from the control circuit 14 to produce a security number for transmission by the remote control. Several cryptography algorithms of this type are described by Mehrdad Foroozesh in an article entitled "Protecting Your Data With Cryptography," *UNIX Review*, November 1996, v14, n12, page 55(6), which description is incorporated herein by reference. These types of encryption techniques and algorithms are commonly used to encrypt computer data being transmitted over common carriers.

Digital data to be transmitted is sent by the control logic 46 in parallel form to a parallel-in/serial-out output register 56. The serial data from the output register 56 is applied to the input of a transmitter section in the second transceiver 40 which modulates a radio frequency carrier signal with that data. The resultant RF signal is sent via the antenna 42 to the control circuit 14 in motor vehicle. The components of the remote control preferably are powered by a battery (not shown).

The remote control 12 can be employed in a conventional manner to unlock the doors of the vehicle or unlatch the trunk lid. In this instance, the driver presses one of the switches 54 that corresponds to the desired function. This action causes the control logic to transmit a signal to the control circuit 14 in motor vehicle. That signal carries a unique identification code for that particular remote control 12 and a designation of the selected function. If the control circuit 14 recognizes that remote control identification code as being authorized to operate this particular vehicle, the control circuit 14 immediately activates the desired function on the vehicle. This is an active mode of operation, as it requires action by the driver in order for the keyless motor vehicle control system 10 to operate.

Figure 2:
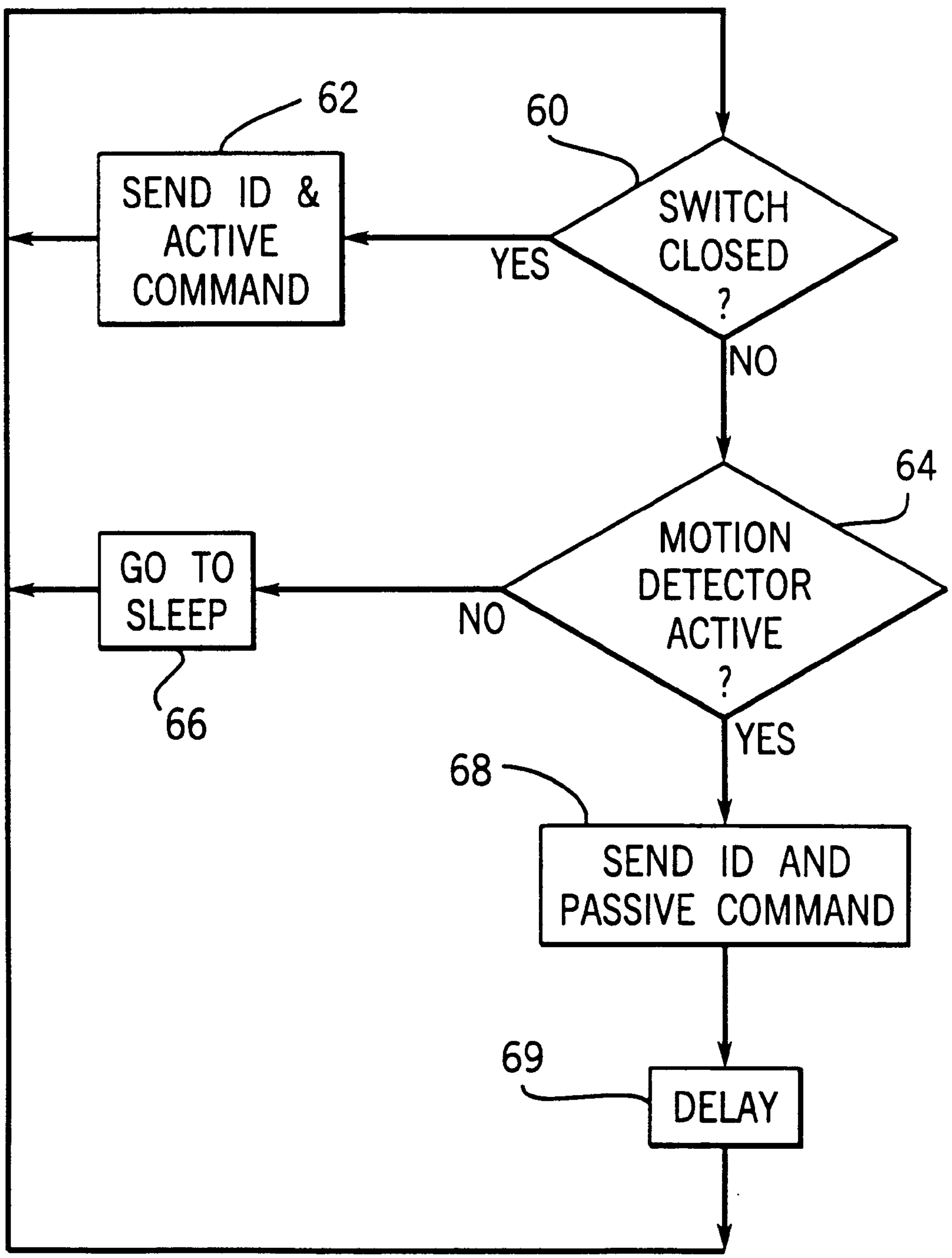
FIG. 2 is a flowchart of the process by which a portable remote control of the RKE sends commands to a control circuit in the vehicle.

The keyless motor vehicle control system 10 also operates in a passive mode in which the driver or other user does not have to press a switch on the remote control 12. With reference to FIG. 2, the remote control 12 typically is in a "sleep state" in which most of its circuits are not powered to conserve battery power. When the user presses one of the switches, the control logic "wakes up" as denoted by step 60. Upon identifying a switch closure the process branches to step 62 at which a command signal is transmitted to the control circuit of the vehicle as described immediately above.

If a switch closure is not detected, the process advances to step 64 where the input from the motion detector 55 in the remote control 12 is examined. If motion is not occurring, the remote control enters the sleep state at step 66. Otherwise, the process branches to step 68 at which the remote control transmits its identification code and a command indicating the passive mode. Specifically the control logic 46 in FIG. 1 obtains the identification code and the passive mode command from the EEPROM 48 and uses that data to form the message packet to send. The message packet is transferred in parallel to the output register 56 and then sent serially to the second radio frequency transceiver 40 from which the signal is transmitted via antenna 42. The second radio frequency transceiver 40 transmits the passive command signal at a lower power level at step 68 than the power level used to send the active command at step 62. This lower power level conserves the battery in the remote control 12.

Thereafter at step 69, the remote control sets a timer to a given delay period. When the delay period expires the process executed by the remote control 12 returns to step 60. It should be understood that if at anytime during the delay period the user activates one of the switches on the remote control 12, the process immediately jumps to step 60.

Thus while the remote control 12 is in motion, as occurs when it is being carried by a moving user, the remote control identification code and the passive command are periodically being sent from the second radio frequency transceiver 40.

Figure 3:
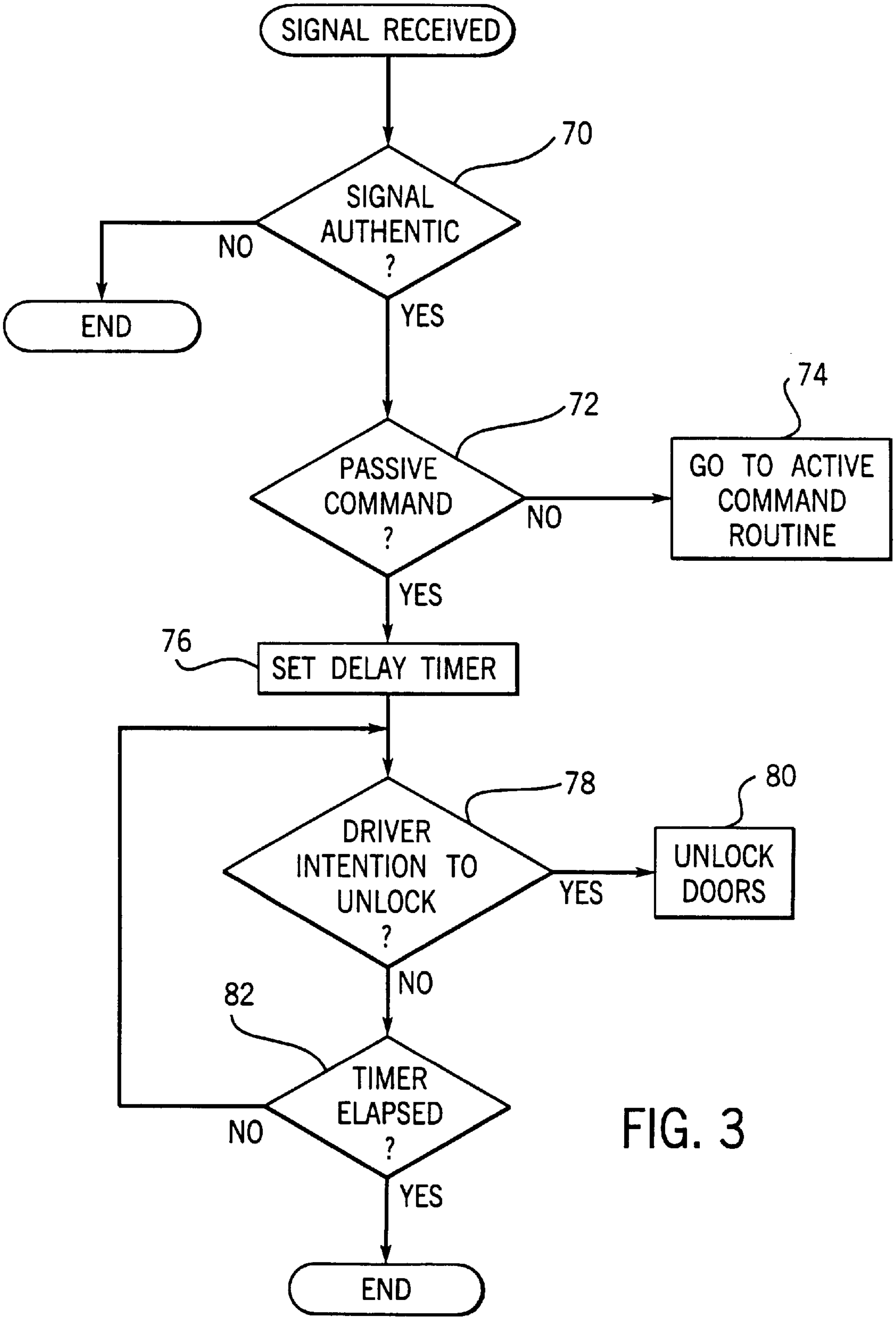
FIG. 3 is a flowchart of the sequence by which the control circuit processes the command

When the person with the remote control 12 is within approximately two meters of the vehicle, for example, the control circuit 14 will receive the passive mode signal from the remote control. Upon detecting a signal on the proper carrier frequency, the control circuit 14 begins executing a signal processing routine depicted by the flowchart of FIG. 3. At step 70, the identification code from the received signal is inspected to determine if it is one that has been programmed into the controller as designating a remote control that is authorized for this particular vehicle. If not, processing of the received signal terminates. It should be understood that the authentication procedure may be more involved when an encryption algorithm is employed for greater security, as mentioned previously.

If the identification code is from an authorized remote control, the signal processing advances to step 72 at which a determination is made by the microcomputer of controller 16 whether the signal carried a passive command. If not the process branches to step 74 and a routine that responds to active commands. When the passive command is found at step 72 the signal processing branches to step 76.

At this juncture, a delay timer within controller 16 is set to a predefined period at step 76. Next, the controller makes a determination at step 78 whether the driver has an intention to enter the vehicle. Rather than simply unlocking the vehicle when the control circuit receives the passive command signal, an additional act is required on the driver's part before unlocking occurs. Otherwise, the mere presence of the driver near the vehicle, such as simply walking along an adjacent sidewalk, would unlock the doors even when the person carrying the remote control has no intention of entering the vehicle. Several different mechanisms can be employed to provide an indication of a driver's intent to enter a vehicle.

The first of these mechanisms involves touching a door of the vehicle. For example, a switch 27, shown in FIG. 1, may be connected to the door handle to provide a signal when the driver operates that handle. This switch 27 could be a capacitive type sensor connected to the door handle to detect touching by the driver. However, it may be preferred to connect the capacitive type sensor to the lock cylinder of the door, because a driver often operates the door handle upon exiting the vehicle to ensure that the door is locked. As the remote control 12 already may have sent the passive command to the control circuit 14, the driver's test operation of the door handle will unlock and open the door when the detection mechanism is attached to the handle. Alternatively, the passive remote unlocking may be inhibited for a period of time upon the vehicle being locked.

A proximity sensor 26 may be used to detect the intention of a driver to enter the vehicle after the passive command has been received. This conventional proximity detector 26 may be one that transmits ultrasound, microwaves or infrared radiation and senses when that radiation is reflected back by an object in close proximity to the vehicle. In order to prevent an inanimate object, such as a lamp post, a tree or another vehicle, from being erroneously detected and causing the doors to unlock, the range of the proximity detector should be relatively small, e.g. less than one meter. A motion detector, similar to those used in security systems, also can be employed to detect the proximity of the driver and yet exclude false triggering by inanimate objects.

Alternatively, detection of the driver's intention to enter the vehicle can be based on the strength of the passive command signal received by the control circuit 14. The vehicle will unlock only when that signal strength exceeds a predefined level which corresponds to the driver being in close proximity (e.g. within one meter) of the vehicle. In this embodiment, the first radio frequency transceiver 30 includes a circuit for measuring the signal strength and providing an indication to the controller 16 when the predefined level is exceeded.

When one of these proximity detection mechanisms is used, it is necessary to inhibit the passive unlocking of the vehicle immediately upon locking until the driver has moved beyond the range of the proximity detector or the receiver of the first radio frequency transceiver 30. Otherwise, the vehicle will unlock immediately as the driver, upon exiting, is within the range of the proximity detector and the first radio frequency transceiver 30.

Referring again to FIG. 3, when the driver's intention to unlock the vehicle is found at step 78 the controller 16 responds by sending a signal that unlocks the doors. Otherwise the process advances to step 82 at which the status of the timer is examined. If the delay period has not elapsed the process returns to step 78 to test again for the driver's intention to enter the vehicle. The signal processing terminates when the timer expires at step 82. Thus if a valid passive command is received and the driver does not act in a manner that indicates an intention to enter the vehicle within the delay period, the control circuit 14 cancels the passive command and returns to wait for another signal from the remote control 12.

The foregoing description is directed primarily to preferred embodiments of the invention. Although some attention was given to various alternatives within the scope of the invention, it is anticipated that skilled artisans will likely realize additional alternatives that are now apparent from the disclosure of those embodiments. Accordingly, the scope of the invention should be determined from the following claims and not limited by the above disclosure.

We claim:

1. A method for operating a device on a motor vehicle using a system which includes a remote control carried by a driver and a control circuit in the motor vehicle, said method comprising the steps of:

the remote control occasionally, automatically transmitting a command signal;

the control circuit, upon receiving the command signal, sensing an action by the driver which indicates an intention to operate the device, and sending an activation signal to the device in response to sensing the action by the driver.

2. The method as recited in claim 1 further comprising the remote control detecting when the remote control is moving.

3. The method as recited in claim 2 wherein when the remote control is moving, the remote periodically transmits the command signal.

4. The method as recited in claim 1 wherein sensing an action by the driver comprises sensing the driver touching the motor vehicle.

5. The method as recited in claim 1 wherein sensing an action by the driver comprises sensing the driver touching part of a door lock of the motor vehicle.

6. The method as recited in claim 1 wherein sensing an action by the driver comprises sensing the driver operating a door handle of the motor vehicle.

7. The method as recited in claim 1 wherein sensing an action by the driver comprises sensing the driver being within a given distance of the motor vehicle.

8. The method as recited in claim 7 wherein sensing the driver being within a given distance of the motor vehicle comprises transmitting radiation from the motor vehicle and detecting reflection of that radiation back to the motor vehicle.

9. The method as recited in claim 1 wherein sensing an action by the driver comprises detecting an object moving within a given distance of the motor vehicle.

10. The method as recited in claim 1 wherein the sensing an action by the driver must occur within a predefined period of time from when the control circuit received the command signal in order for the activation signal to be sent to the device.

11. An apparatus for operating a device on a motor vehicle, the apparatus comprising:

a remote control adapted to be carried by a driver, the remote control occasionally, automatically transmitting a command signal;

a receiver on the vehicle to receive the command signal from the remote control and in response produce a receiver signal;

a sensor on the vehicle to detect an action by the driver which indicates an intention to operate the device and in response produce a sensor signal; and controller in the motor vehicle and connected to the sensor, the receiver and the device, the controller upon receiving the receiver signal and the sensor signal sends an activation signal to the device.

12. The apparatus as recited in claim 11 wherein the remote control includes a motion detector and wherein the command signal is sent in response to the motion detector sensing movement of the remote control.

13. The apparatus as recited in claim 11 wherein the sensor detects the driver touching part of the motor vehicle.

14. The apparatus as recited in claim 13 wherein the sensor is a capacitive sensor connected to the part of the motor vehicle.

15. The apparatus as recited in claim 11 wherein the sensor comprises a switch coupled to a door handle of the motor vehicle.

16. The apparatus as recited in claim 11 wherein the sensor detects when the driver is within a given distance of the motor vehicle.

17. The apparatus as recited in claim 16 wherein the sensor detects strength of a signal from the remote control to determine when the driver is within a given distance of the motor vehicle.

18. The apparatus as recited in claim 16 wherein the sensor transmits radiation and detects reflection of that radiation.

19. The apparatus as recited in claim 18 wherein the sensor transmits radiation selected from the group consisting of infrared light, microwaves and ultrasound.

20. The apparatus as recited in claim 11 wherein the controller produces the activation signal only when the sensor signal is received within a predefined period of time after receipt of the receiver signal.

* * * * *